United States Patent
Kim et al.

(10) Patent No.: US 11,492,073 B2
(45) Date of Patent: Nov. 8, 2022

(54) POWER ASSISTED DRIVING SYSTEM AND METHOD

(71) Applicants: CHUNG-ANG UNIVERSITY INDUSTRY-ACADEMIC COOPERATION FOUNDATION, Seoul (KR); FOUNDATION FOR RESEARCH AND BUSINESS, SEOUL NATIONAL UNIVERSITY OF SCIENCE AND TECHNOLOGY, Seoul (KR)

(72) Inventors: Jung Yup Kim, Seoul (KR); Dong Jun Shin, Seoul (KR)

(73) Assignees: CHUNG-ANG UNIVERSITY INDUSTRY-ACADEMIC COOPERATION FOUNDATION, Seoul (KR); FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 1130 days.

(21) Appl. No.: 16/304,120

(22) PCT Filed: Feb. 3, 2017

(86) PCT No.: PCT/KR2017/001163
§ 371 (c)(1),
(2) Date: Nov. 21, 2018

(87) PCT Pub. No.: WO2017/135716
PCT Pub. Date: Aug. 10, 2017

(65) Prior Publication Data
US 2020/0324856 A1 Oct. 15, 2020

(30) Foreign Application Priority Data

Feb. 5, 2016 (KR) .................. 10-2016-0014665
Feb. 12, 2016 (KR) .................. 10-2016-0016534
(Continued)

(51) Int. Cl.
*B62M 6/50* (2010.01)
*B62M 9/00* (2006.01)
(Continued)

(52) U.S. Cl.
CPC .............. *B62M 6/50* (2013.01); *B62J 45/411* (2020.02); *B62K 11/02* (2013.01); *B62M 9/00* (2013.01); *G01L 5/0038* (2013.01)

(58) Field of Classification Search
CPC ... B62M 6/50; B62M 9/00; B62M 6/90; B62J 45/411; B62J 45/40; B62J 43/10; G01L 5/0038; B62K 11/02
See application file for complete search history.

(56) References Cited

U.S. PATENT DOCUMENTS

2012/0097467 A1* 4/2012 Maeno ................... B62M 11/16
180/206.7
2016/0023081 A1* 1/2016 Popa-Simil ............ B62J 45/412
700/91

FOREIGN PATENT DOCUMENTS

JP 2002-255083 9/2002
JP 2010-280290 12/2010
(Continued)

OTHER PUBLICATIONS

JP 2011168241A translate.*
(Continued)

*Primary Examiner* — Tyler J Lee
*Assistant Examiner* — Yufeng Zhang
(74) *Attorney, Agent, or Firm* — Meunier Carlin & Curfman LLC

(57) ABSTRACT

According to one embodiment of the present invention, provided is a power assisted driving system comprising: a measurement part for measuring an operation state of a crank; a control part for determining a voltage or current (Continued)

necessary for power assistance on the basis of the measured value of the measurement part; a motor part, to which the voltage or current is applied, for providing driving power; and a power supply part for providing electric power to components other than itself.

17 Claims, 8 Drawing Sheets

(30) Foreign Application Priority Data

Aug. 3, 2016 (KR) .................. 10-2016-0099024
Aug. 3, 2016 (KR) .................. 10-2016-0099026

(51) Int. Cl.
*B62K 11/02* (2006.01)
*B62J 45/411* (2020.01)
*G01L 5/00* (2006.01)

(56) References Cited

FOREIGN PATENT DOCUMENTS

| | | |
|---|---|---|
| JP | 2011-168241 | 9/2011 |
| JP | 2012-162174 | 8/2012 |
| KR | 1020130013115 | 2/2013 |

OTHER PUBLICATIONS

JP 2012162174A translate.*
International Search Report and Written Opinion. Korean International Searching Authority. Application No. PCT/KR2017/001163. dated May 10, 2017. 31 pages.

* cited by examiner

[FIG. 1]
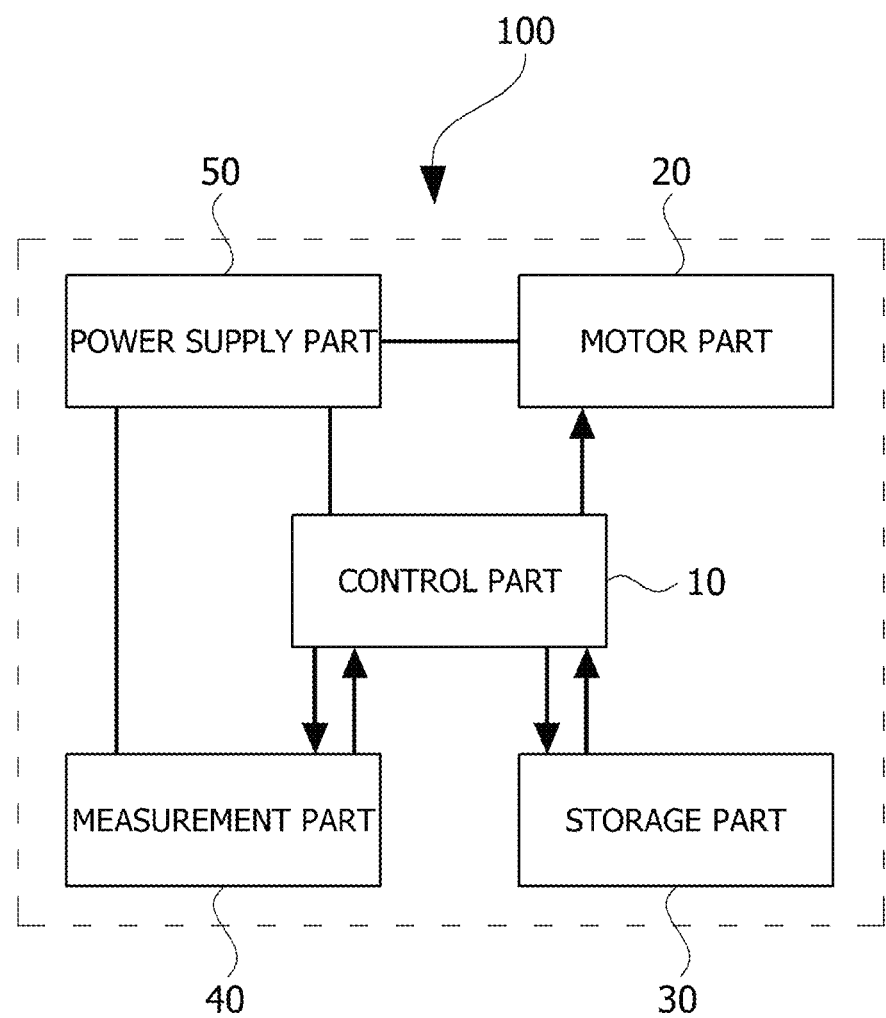

[FIG. 2]
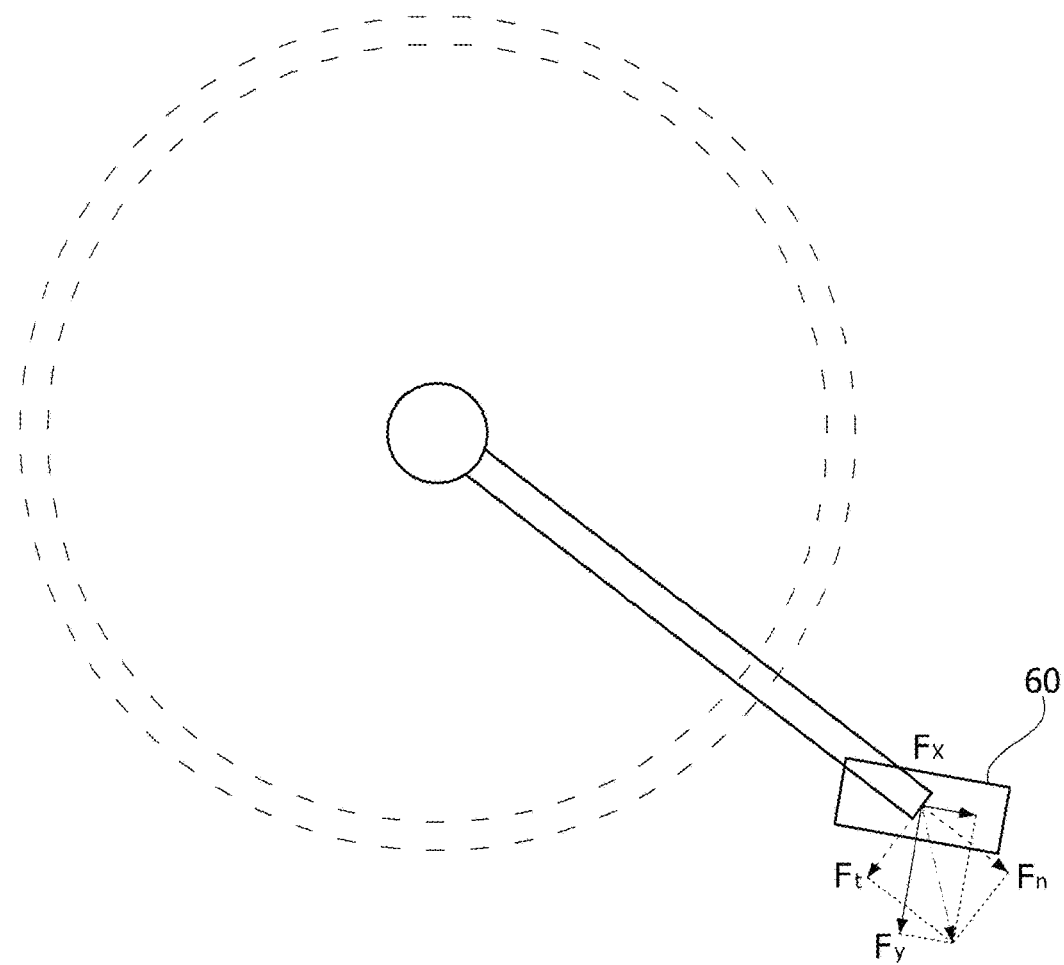

[FIG. 3]
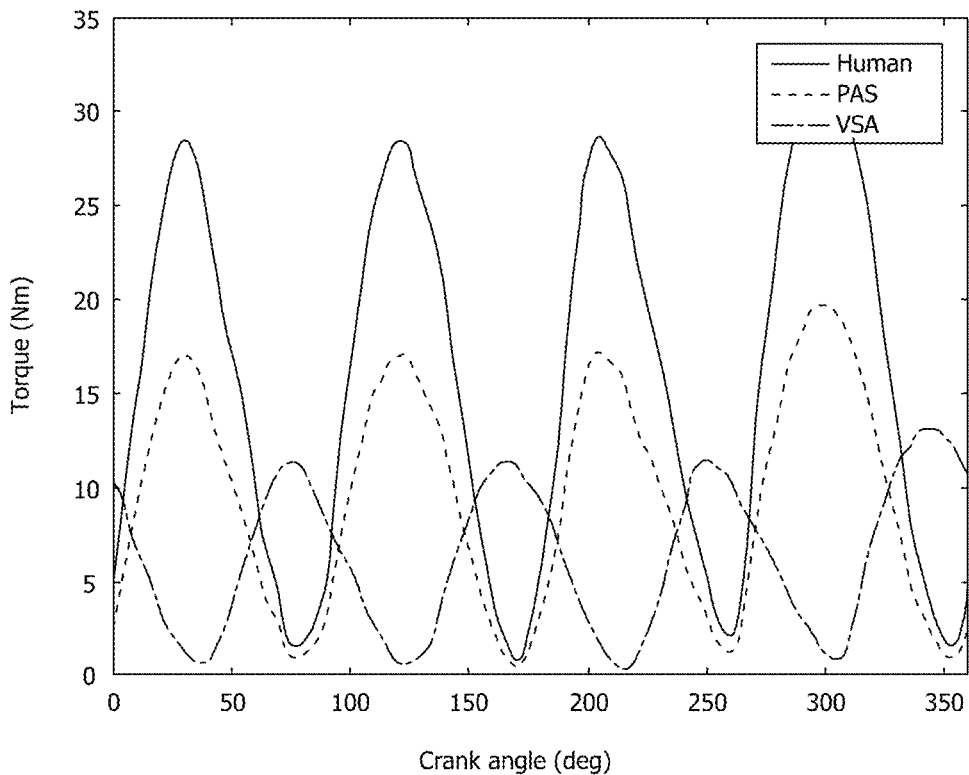
[FIG. 4]
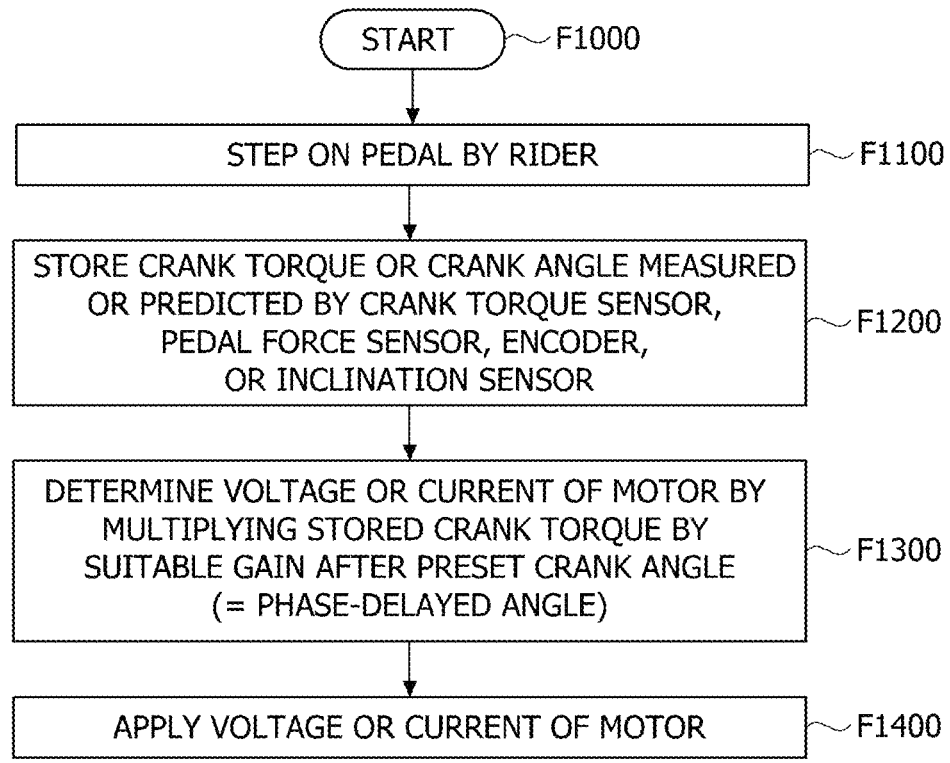

[FIG. 5]
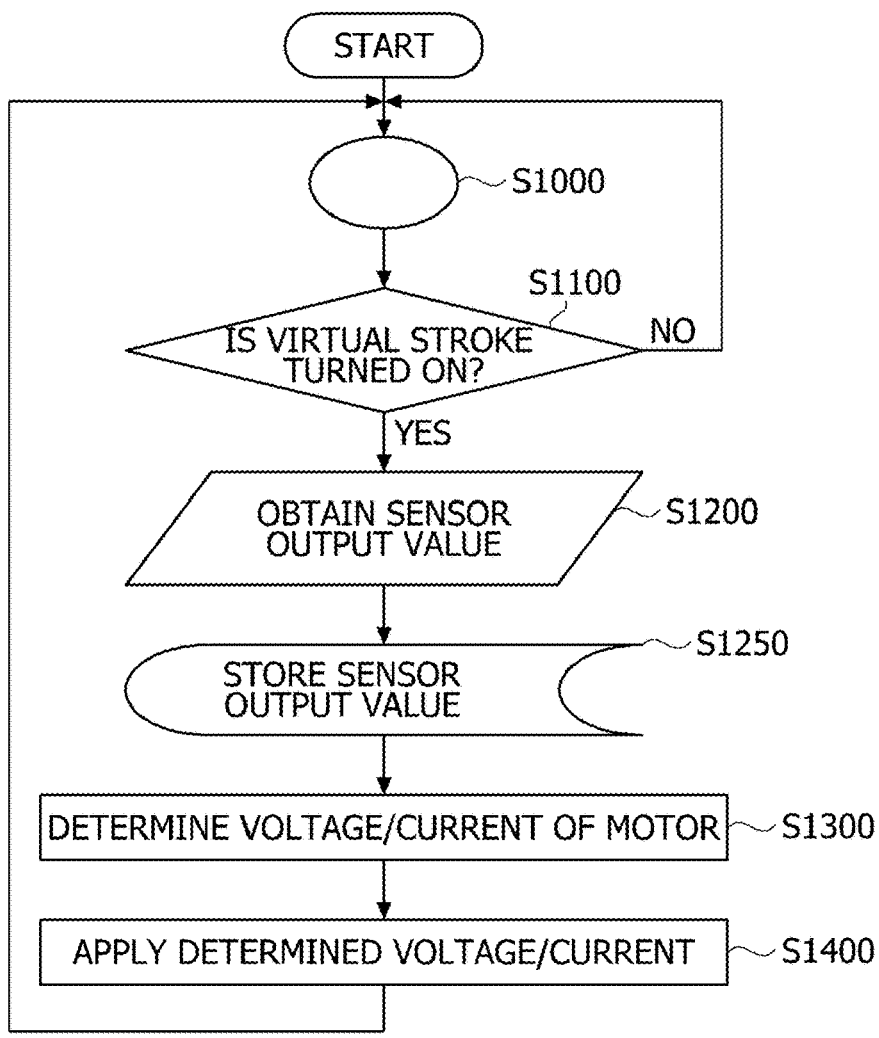
[FIG. 6]
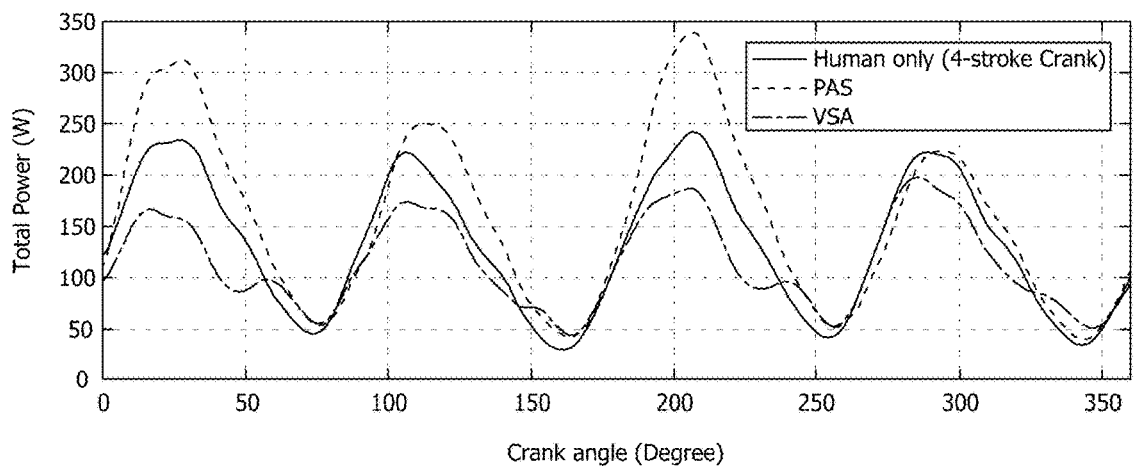

[FIG. 7]
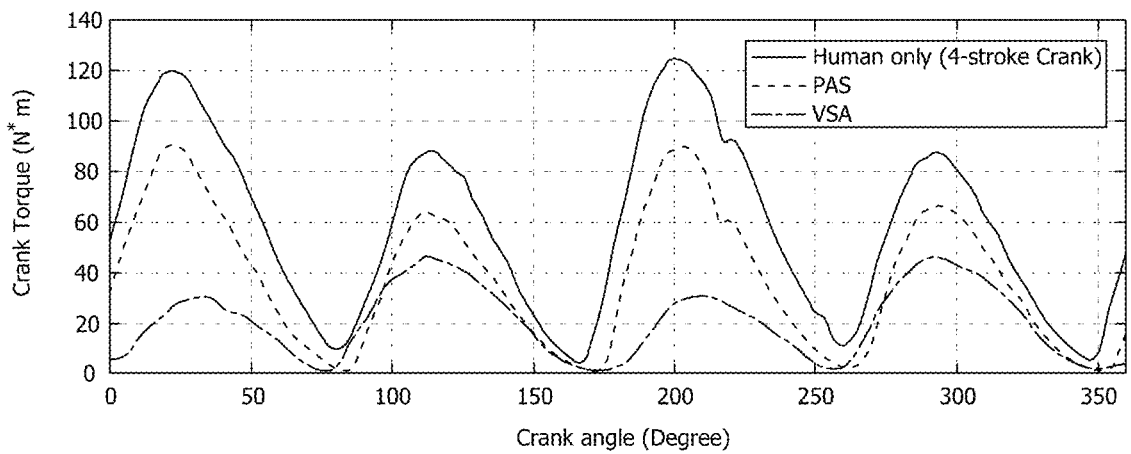
[FIG. 8]
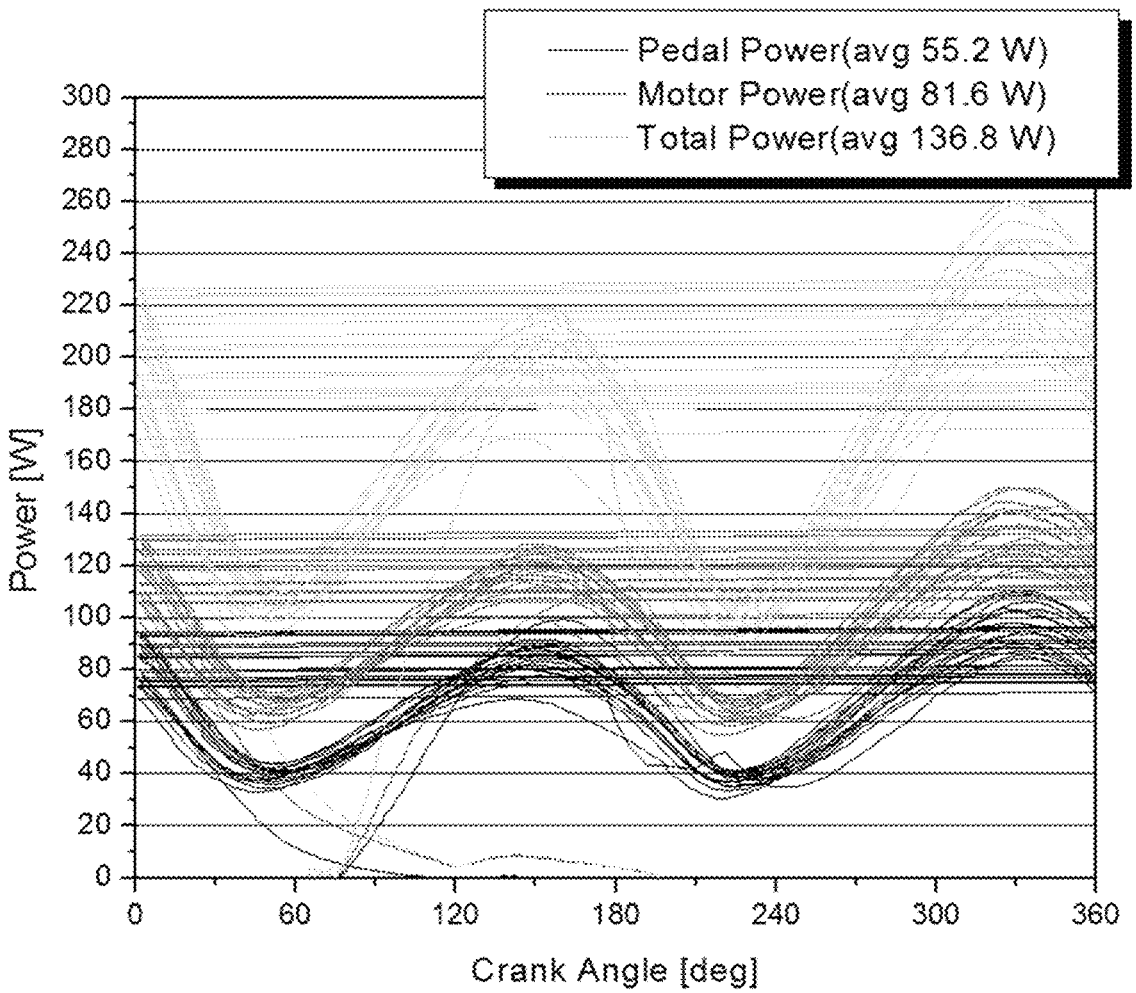

[FIG. 9]
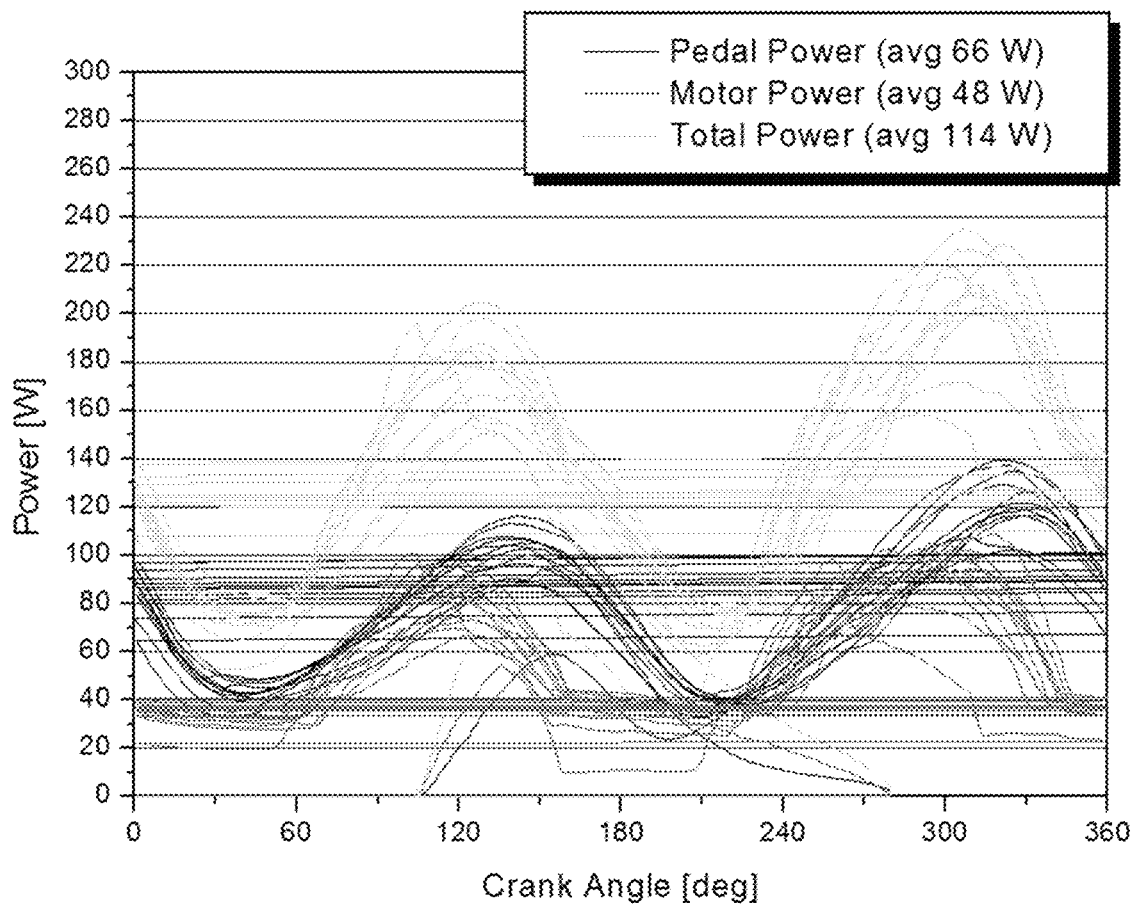

[FIG. 10]
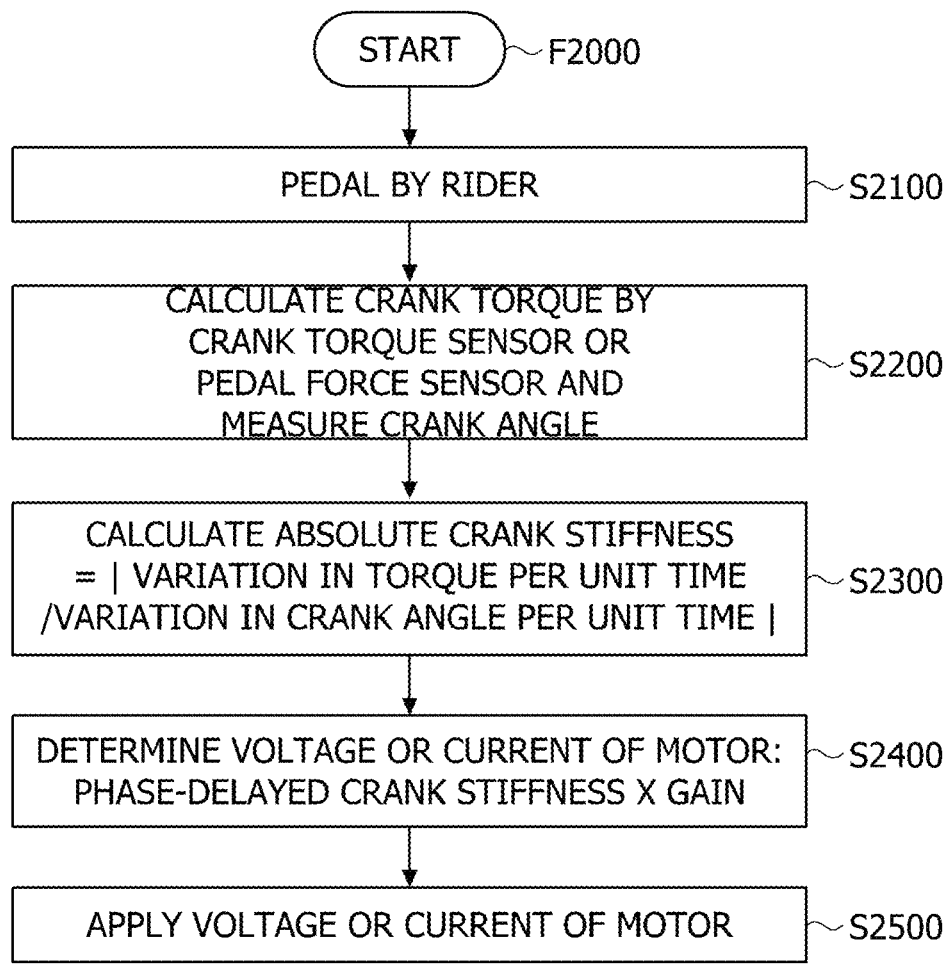

[FIG. 11]
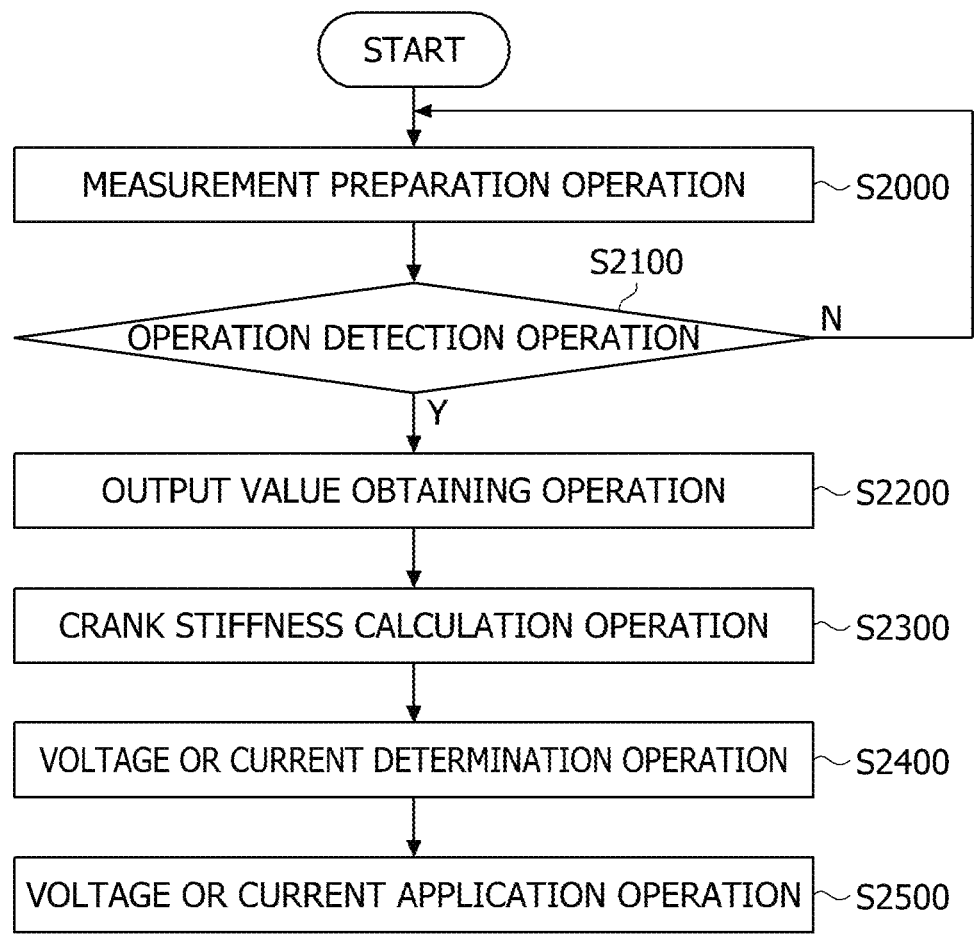

POWER ASSISTED DRIVING SYSTEM AND METHOD

TECHNICAL FIELD

The present invention relates to a power assisted driving system and method capable of smoothly accelerating and improving energy efficiency of a driving unit such as an electric bicycle in which a pedal force of a person and power of the driving unit are used together.

BACKGROUND ART

Generally, a bicycle is a two-wheeled vehicle which moves by rotating wheels through a crank-pedal mechanism when a person applies a force to a pedal, and is widely used for transportation, exercise, and leisure. Recently, since a bicycle revitalization policy is being pushed nationwide to reduce carbon emissions which are a cause of global warming, bicycle use is rapidly increasing as a means of commuting as well as a means of exercise and leisure.

Since the bicycle allows a user to use less stamina than that used when the user runs the same distance while the user moves to a destination in a short time, the old and weak can use the bicycle well without difficulty, but in a case in which there are many inclined roads, stamina greater than that needed to walk or run is necessary, and when a distance to a destination is far away, much stamina must be used, and thus there is actually a problem of harming the user's health.

Electric bicycles, which are starting to be used to solve the problem, is formed by installing a direct current (DC) motor at a wheel hub and the like of a general bicycle, and the DC motor may serve to supplement power and may allow pleasant driving on flatland and uphill.

A driver of a general electric bicycle may selectively utilize one of two modes of a throttle mode and a pedal assist system (PAS) mode to control a level of power supplementing of the DC motor provided in the electric bicycle.

In the throttle mode, a throttle lever serves a function which is similar to that performed by a throttle lever used in a general motorcycle, is installed on a right handle bar of the electric bicycle, and is pulled or released to change speed of the electric bicycle, that is, the throttle lever is installed on the electric bicycle and serves to change a torque value of the DC motor configured to serve an auxiliary power function.

In the PAS mode, a driver of the electric bicycle may control an output of a motor by pedaling, and a magnitude of torque due to power supplementing of the DC motor included in the electric bicycle may be controlled through a speed sensor configured to detect rotation of a crankshaft when pedaling.

The speed sensor, which utilizes a Hall effect, is generally installed on a crankshaft of the electric bicycle and detects rotation of the crankshaft through a voltage generated due to the Hall effect when an electric bicycle driver steps on a pedal.

A speed sensor torque control unit used in a conventional electric bicycle operates in an on-off method which detects only whether a driver steps on the pedal, and when a voltage is detected by a speed sensor, power is supplemented by setting a torque value of the DC motor of the electric bicycle to a maximum value. However, since the conventional electric bicycle supplements power in proportion to revolutions per minute (RPM) of the crankshaft measured by a Hall sensor, power is actually rapidly reduced at low speed, and there is a problem in that not much power is supplemented when high power is necessary at the low speed.

Although there are torque sensor methods as alternatives to problems of the speed sensor method, the torque sensor methods are mechanical methods which measure twisting of a disk, a spring, or the like occurring when pedaling, and have problems in that a torque sensor requires a high installation cost and it is difficult to install the torque sensor on the electric bicycle, and thus an effective solution is necessary to control a motor output in proportion to a speed through the speed sensor method.

Patent document 1 proposed an electric bicycle torque control unit capable of variably controlling a torque of a motor according to an analog output signal of a speed sensor. Although a control of an output of the motor performed in proportion to a speed of pedaling according to patent document 1 is convenient, since a speed sensor operating in a digital method and formed of a double Hall sensor outputs a digital pulse signal, there is a problem in that it is difficult to use the speed sensor operating in the digital method through the method proposed in patent document 1 in which an analog signal is received and thereafter used.

In addition, in a driving system of a conventional electric bicycle, since a motor included in the electric bicycle is driven in a phase angle section of a crank in which power transmission efficiency of a rider is high, there is a problem in that energy efficiency of a total system is reduced as compared to total energy consumption which is a total of energy consumed by the rider and energy consumed by driving the motor.

In addition, since the electric bicycle simultaneously uses a power of a person and a power of a driving unit, the electric bicycle may be considered as a hybrid system, and there are example systems of the hybrid system such as an electric wheelchair and an electric scooter in which a power of a person and a power of a driving unit are used together.

Hereinafter, a hybrid system is a generic term for systems such as an electric bicycle, an electric wheelchair, and an electric scooter which simultaneously use the power of a person and the power of a driving unit.

In addition, a power supplementing unit based on a speed sensor used in the conventional electric bicycle operates in an on-off method which detects only whether a driver steps on a pedal, and the power supplementing unit supplements power by setting a torque value of a DC motor of the electric bicycle to a maximum value when a voltage is detected by the speed sensor.

However, since the conventional electric bicycle supplements power in proportion to the RPM of a crankshaft measured by the Hall sensor, power of the motor is actually rapidly reduced at low speed, and thus there is a problem in that not much power is supplemented when high power is necessary at the low speed.

There is a torque sensor method as an alternative to the problem of the speed sensor method.

Since torque sensor methods are mechanical methods, which measure twisting of a disk, a switch, or the like occurring when pedaling, and have problems in that a torque sensor requires high installation cost and it is difficult to install the torque sensor on the conventional electric bicycle, an effective alternative is necessary to control a motor output in proportion to a speed through the speed sensor method.

Patent document 1 (Korean Patent Laid-open No. 10-2014-0142117) proposed an electric bicycle torque control unit capable of variably controlling a torque of a motor in proportion to an analog output signal of a speed sensor. Although a control of an output of the motor performed in proportion to a speed of pedaling according patent document 1 is convenient, since the speed sensor operating in a digital method and formed of a double Hall sensor outputs a digital pulse signal, there is a problem in that it is difficult to use the speed sensor operating in the digital method through the method proposed in patent document 1 in which an analog signal is received and thereafter used.

In addition, since the motor output is controlled in proportion to a pedaling speed, there are problems in that the pedaling speed has to be increased to drive the electric bicycle at high speed even when a driver does not desire to increase the pedal speed, a strange pedaling sensation occurs because it is difficult to predict an exact depressing time of the pedaling, and ride comfort is lowered.

DISCLOSURE

Technical Problem

The present invention is directed to providing a power assisted driving system and method utilizing virtual stroke actuation (VSA) of a hybrid system capable of increasing energy efficiency by driving a motor in a section in which power transmission efficiency of a person is not high but low.

The present invention is also directed to providing a power assisted driving system and method utilizing VSA of a hybrid system capable of smoothly increasing a speed of the hybrid system by decreasing a variation in torque of a rotating shaft according to power transmission of the hybrid system.

The present invention is also directed to drive a motor of an electric bicycle in proportion to a stiffness of a crank interacting with a person to increase driving energy efficiency of the electric bicycle, reduce a strange pedaling sensation, and improve ride comfort.

Objectives to be solved by the present invention are not limited to the above-described objectives, and other objectives, which are not described above, may be clearly understood by those skilled in the art through the following specification.

Technical Solution

One aspect of the present invention provides a power assisted driving system including: a measurement part configured to measure an operation state of a crank; a control part configured to determine a voltage or current necessary for power supplementing on the basis of a measured value of the measurement part; a motor part to which the voltage or current is applied to supply driving power; and a power supply part configured to supply electric power to components except itself.

In one embodiment of the present invention, the measurement part may measure both an angle and a torque of the crank provided in a hybrid system.

In addition, a power assisted driving method may include a start operation of a virtual stroke actuation (VSA) method in which the measurement part is initialized and transmission of power is waited for; an operating determination operation of the VSA method in which it is determined whether the VSA method operates according to whether power is transmitted; a measurement operation of the VSA method in which a crank angle and a crank torque are measured; a storage operation of the VSA method in which the crank angle and the crank torque are stored in a storage part; a determination operation of the VSA method in which a voltage or current applied to a virtual stroke driving motor is determined by using the crank angle and the crank torque measured in the measurement operation; and an application operation of the VSA method in which the determined voltage or current is applied to the virtual stroke driving motor.

In another embodiment of the present invention, the control part may determine the voltage or current value on the basis of a stiffness of the crank.

In addition, a power assisted driving method which is based on a crank stiffness may include a measurement preparation operation in which a sensor is initialized to prepare measurement; an operating detection operation in which it is detected whether an auxiliary driving method operates; an operation in which an output value is obtained from the sensor; a crank stiffness calculation operation in which a stiffness of the crank is calculated from the output value; a voltage or current determination operation in which a voltage or current applied to a motor is determined in proportion to the stiffness of the crank; and an operation in which the determined voltage or current is applied to the motor.

Advantageous Effects

According to one embodiment, there is an effect in that energy efficiency of a hybrid system can be improved.

In addition, there is an effect in that a variation in wheel torque according to a crank angle of the hybrid system decreases.

In addition, the hybrid system can be smoothly accelerated, and ride comfort can be improved.

According to another embodiment, there are effects in that intention of a driver can be accurately predicted to drive a motor, a strange pedaling sensation can be reduced, and ride comfort and energy efficiency can be also improved.

In addition, there are advantages in that the strange pedaling sensation is minimized, energy efficiency is improved, and a weight is lowered while the same output power is obtained.

Various useful advantages and effects may not be limited to the above-described effects, and may be more easily understood through a process in which specific embodiments of the present invention are described.

DESCRIPTION OF DRAWINGS

FIG. 1 is a configuration diagram illustrating a configuration of a power assisted driving system.

FIG. 2 is a view illustrating a state in which a measurement part, which is a component in FIG. 1, measures a torque from a power transmission part in a hybrid system according to one embodiment of the present invention.

FIG. 3 is a graph showing power compensation according to a phase delay in the configuration of FIG. 1.

FIG. 4 is a flowchart illustrating a process flow of a power assisted driving method utilizing a virtual stroke actuation (VSA) of a hybrid system according to the embodiment of the present invention.

FIG. 5 is a flowchart illustrating a process order of FIG. 4.

FIG. 6 is a graph showing a magnitude of a total force according to a crank angle in a case in which the embodiment of the present invention is applied.

FIG. 7 is a graph showing a change in total torque according to a crank angle in the case in which the embodiment of the present invention is applied.

FIG. 8 is a graph showing an amount of total power consumption according to a crank angle in a conventional power assisted system.

FIG. 9 is a graph showing an amount of total power consumption according to a crank angle in a case in which another embodiment of the present invention is applied.

FIG. 10 is a flowchart illustrating a process flow of a power assisted driving method based on a crank stiffness according to another embodiment of the present invention.

FIG. 11 is a flowchart illustrating a process order of FIG. 10.

MODES OF THE INVENTION

While the present invention may be modified in various ways and take on various alternative forms, specific embodiments thereof are shown in the drawings and described in detail below. However, it should be understood that there is no intent to limit the present invention to the particular forms disclosed, but on the contrary, the present invention covers all modifications, equivalents, and alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

The terminology used herein to describe embodiments of the present invention is not intended to limit the scope of the present invention. The articles "a," and "an" are singular in that they have a single referent, however the use of the singular form in the present document should not preclude the presence of more than one referent. In other words, elements of the present invention referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when in a case in which one element is described as being formed on (or under) another element, such a description may include a case in which the one element is formed at an upper side or a lower side with respect to another element.

Hereinafter, the exemplary embodiments of the present invention will be described in detail with reference to the accompanying drawings. The same or corresponding elements will be consistently denoted by the same respective reference numerals and described in detail no more than once regardless of drawing symbols.

Only main components are clearly illustrated in FIGS. 1 to 11 to aid in clearly conceptually understanding the present invention, and as a result, various modifications of the drawings are predicted, and the scope of the present invention need not be limited by specific shapes of the components illustrated in the drawings.

The present invention includes a measurement part configured to measure an operation state of a crank, a control part configured to determine a voltage or current necessary for power supplementing on the basis of measured values of the measurement part, a control part configured to apply a voltage or current to provide driving power, a motor part configured to receive the voltage or current determined by the control part to provide driving power, and a power supply part configured to supply electric power to components except itself.

Hereinafter, the invention will be described according to embodiments.

A power assisted driving system and method utilizing virtual stroke actuation (VSA) of a hybrid system according to one embodiment of the present invention will be described with reference to FIGS. 1 to 7.

FIG. 1 is a configuration diagram illustrating a configuration of a power assisted driving system utilizing VSA of a hybrid system.

Referring to FIG. 1, a power assisted driving system 100 utilizing the VSA of the hybrid system according to the embodiment of the present invention may include a control part 10, a motor part 20, a storage part 30, a measurement part 40, and a power supply part 50.

The control part 10 controls all driving functions of the power assisted driving system 100 utilizing the VSA of the hybrid system. Specifically, the control part 10 serves to control the motor part 20, the storage part 30, and the measurement part 40 which are components of the present invention. The control part 10 controls the measurement part 40 to initialize the measurement part 40 or receives measured values measured by the measurement part 40. In a case in which a virtual stroke is actuated at a virtual stroke occurrence time from the measured values, the control part 10 calculates a voltage or current applied to a motor and applies the calculated voltage or current to the motor of the hybrid system.

In addition, the control part 10 may be formed as a general microprocessor type control part.

In a case in which the power assisted driving system 100 utilizing the VSA of the hybrid system is realized in an electric bicycle, the control part 10 may determine a voltage or current necessary for the VSA according to a body size of a rider and a travel situation to reduce a rapid change in torque applied to the crank. The travel situation may be determined by considering inclination of a road and current acceleration. To consider the travel situation, a control variable according to the travel situation may be stored in the storage part 30, and the control part 10 may determine a voltage or current necessary for the VSA by using the control variable stored in the storage part 30.

The motor part 20 may transmit driving power for driving the power assisted driving system utilizing the VSA of the hybrid system using the voltage or current applied at a virtual stroke occurrence time according to a control of the control part 10. In addition, although the motor part 20 may include an encoder, whether the motor part 20 includes the encoder is not related to a configuration of the present invention, and since uses of the encoder in the motor part 20 are known, the encoder will not be described separately.

The storage part 30 serves to store a torque of the crank according to an angle of the crank measured by the measurement part 40, and the control part 10 may refer to the stored angle and torque of the crank.

A suitable range or optimum value of a crank torque according to an angle of the crank may be stored in the storage part 30 in a lookup table form, and the control part 10 may refer to the suitable range or optimum value as necessary.

As an embodiment, in a case in which the crank rotates, the storage part 30 may store a crank torque according to an angle of the crank measured by the measurement part 40 in a storage table. Here, since the crank rotates repeatedly, the crank torque may be continuously updated according to the crank angle, and the control part 10 may use continuously updated information.

In addition, in the exemplary embodiment of the present invention, the storage part 30 may be integrally formed with the control part 10.

The measurement part 40 measures an operation state of the crank included in the hybrid system.

The measurement part 40 may measure various variables by which a rotating state of the crank may be determined, and various measurement units may be used to measure the variables. As an embodiment, the measurement part 40 may measure an angle and torque of the crank. The measurement part 40 may be formed to measure the angle and torque of the crank separately or together. At least one among a crank torque sensor, a pedal force sensor, and a pressure sensor may be used as the measurement part 40 for measuring the crank angle and torque.

In the case in which the crank torque sensor is used, the crank torque sensor may be installed on a frame or crank of the hybrid system. As an embodiment, in a case in which the crank torque sensor is installed on the frame, the crank torque sensor may be installed at one location among locations by which the crank passes while rotating. This is to install the crank torque sensor within a rotating radius of the crank so as to improve accuracy of a measured value of torque.

The power supply part 50 serves to supply electric power to the control part 10, the motor part 20, and the measurement part 40, and in a case in which the storage part 30 is not integrated with the control part 10 but is formed separately, the power supply part 50 is formed to also supply electric power to the storage part 30.

In addition, although the control part 10 does not transmit a control signal to the power supply part 50 in FIG. 1, the control part 10 may also be formed to transmit the control signal to the power supply part 50 to control electric power supplied to the parts.

Lines which connect the parts in FIG. 1 will be described. Lines which include one ends at which arrows are not drawn denote power lines for supplying electric power generated by the power supply part 50 to the parts, lines which include ends at which arrows are drawn denote a transmission direction of control signals or data, wherein the signals or data are transmitted from the components connected to the lines having the ends which do not have the arrows at the ends to the components connected to the lines having the ends which have the arrows.

In addition, in the description of the present invention, an example case in which a VSA system is applied to a bicycle is described for the sake of convenience in the description, but this is not to limit the VSA system of the present invention which is to be applied to the bicycle, and it should be understood that the bicycle is regarded as only an example such that anyone, including those skilled in the art, easily understand the present invention.

A case in which the VSA system of the present invention is applied to a wheelchair may be understood by replacing the crank with a rotating shaft and replacing the pedal with a rim in the description of the embodiment in which it is applied to the bicycle.

In addition, a case in which the VSA system of the present invention is applied to an apparatus other than the bicycle and wheelchair may be understood by replacing names of parts described as the crank and the pedal in the description of the embodiment of the present invention with names of components corresponding to the crank and pedal in the corresponding apparatus.

FIG. 2 is a view illustrating a state in which the measurement part 40 measures a torque from the power transmission part 60 in the power assisted driving system utilizing the VSA of the hybrid system according to the embodiment of the present invention.

Referring to FIG. 2, the measurement part 40 of the power assisted driving system utilizing the VSA of the hybrid system may measure a torque applied to the crank from a force applied to the power transmission part 60. The measurement part 40 may be positioned inside the power transmission part 60, and in a case in which the measurement part 40 is positioned outside the power transmission part 60, the measurement part 40 may receive a force measured at the power transmission part 60 through short-range communication. In addition, the power transmission part 60 may operate as the measurement part 40. As an embodiment, a pedal in the electric bicycle may be used as the power transmission part 60.

The power transmission part 60 is rotatably connected to an end portion of the crank, and a load is applied to the power transmission part 60 to drive the power assisted driving system 100 utilizing the VSA of the hybrid system. The measurement part 40 may measure a rotation angle θ between the load applied to the power transmission part 60 and a horizontal surface of the power transmission part 60. The measurement part 40 measures a total force F applied to the power transmission part 60 by using a load value (a vertical force component and a horizontal force component) and the rotation angle θ measured at the power transmission part 60. Then, the measurement part 40 divides the total force F applied to the power transmission part 60 into a tangential force component Ft and a normal force component Fn of a rotating radius of the crank. The measurement part 40 may measure a torque applied to the crank by using the tangential force component Ft and the normal force component Fn.

A detailed operation of the power assisted driving system utilizing the VSA of the hybrid system will be described with reference to FIGS. 1 to 2.

The power assisted driving system utilizing the VSA of the hybrid system measures an operation state of the crank through the measurement part 40. The control part 10 determines a voltage or current necessary for the VSA on the basis of measured values of the measurement part 40 and drives the motor part 20.

$$S_{motor}=k*f(\theta_{crank}^{current}-\Phi) \quad \text{[Equation 1]}$$

Equation 1 is an equation for the control part 10 to calculate a voltage or current value to be applied to the motor.

$S_{motor}$ is a voltage or current signal applied to the motor.

k is a proportional constant, is set to minimize a variation in wheel torque, and is set to 1 in the VSA system according to the exemplary embodiment of the present invention. In addition, k may also be adjusted to a value other than one in consideration of a travel situation and the like to minimize the variation in wheel torque. In some embodiments, various situations and k values according to the various situations are listed in a lookup table and are stored in the storage part 30, and the control part 10 may refer to the lookup table and select a necessary value to use for calculation.

$\theta_{crank}^{current}$ refers to a present angle of the crank measured by the measurement part 40.

$\Phi$ is a phase lag angle, is a difference between a crank angle at a time at which driving power generated by the rider is supplied and a crank angle at a time at which driving power generated by VSA is supplied, and is a preset value, but may be changed to minimize energy consumption during travel. As an embodiment, in four-stroke crank driving, a phase lag angle may be 45°.

In addition, in a case in which a $\Phi$ value is 360°, since a time at which driving power is supplied by the VSA is the same as a time at which driving power is supplied by a rider, use for a VSA method becomes meaningless, but since there are some specific cases in which there is no need to generate driving power through the VSA, setting of the $\Phi$ value to 360° may be allowed.

FIG. 3 is a graph showing power compensation according to a phase delay in the power assisted driving system utilizing VSA of a hybrid system according to the embodiment of the present invention.

In FIG. 3, magnitudes of torque generated by a human, an electric bicycle (PAS), and a VSA (VSA) system are shown separately in the graph.

In the case of the human, when driving the bicycle, a torque is generated in a direction in which an angle of the crank is changed and the load is applied. In addition, in the case of the electric bicycle, although power is supplemented, this only serves to increase power, and a phase angle is not delayed.

However, in the power assisted driving system utilizing the VSA of the hybrid system, the human and the motor part operate together. Accordingly, the power assisted driving system utilizing the VSA of the hybrid system applies phase-delayed motor power to a crank torque instead of simply supplementing power as in the case of the electric bicycle.

As expressed by Equation 1, efficiency of power supplementing may be improved using a phase lag angle.

As described above, since the VSA system of the hybrid system supplements power in a section in which it is difficult to apply driving power of the human by supplementing power, there is an effect wherein the driving efficiency is improved.

Meanwhile, hereinafter, a power assisted driving method utilizing the VSA of the hybrid system according to one embodiment of the present invention will be described with reference to the accompanying drawings. However, descriptions of portions which are the same as those of the power assisted driving system utilizing VSA of a hybrid system will be omitted.

FIG. 4 is a flowchart illustrating a process flow of the power assisted driving method utilizing VSA of a hybrid system according to the embodiment of the present invention, and FIG. 5 is a flowchart illustrating a process order of the power assisted driving method utilizing the VSA of the hybrid system. In FIGS. 4 and 5, the same reference numerals denote the same components in FIGS. 1 to 3, and detailed descriptions thereof will be omitted.

Referring to FIG. 4, a schematic process flow of the power assisted driving method utilizing the VSA of the hybrid system according to the embodiment of the present invention is divided into five operations from F1000 to F1400.

Hereinafter, each of the five operations from F1000 to F1400 will be described.

In operation F1000, the power assisted driving method utilizing the VSA of the hybrid system according to the present invention starts, and when a person is riding on the hybrid system according to the present invention, a pedal input of the rider, that is, a pedaling operation, is waited for.

In operation F1100, when the crank and the wheel start to rotate by pedaling of the person riding the hybrid system according to the present invention, the measurement part 40 starts to measure and output measured values.

In operation F1200, the measured values output from the measurement part 40 are stored in the storage part 30 through the control part 10. Here, the measured values include an angle and torque of the crank, and when the angle and torque of the crank are stored in the storage part 30, torques according to various angles are linked to the angles and stored in the storage part 30.

In operation F1300, a voltage or current applied to the motor is determined by multiplying a crank torque linked to a crank angle after a preset crank angle (after a phase lag angle) by a suitable gain or a proportional constant k.

In operation F1400, the voltage or current determined in the F1300 operation is applied to the motor and allows the motor to perform the VSA.

The power assisted driving method utilizing the VSA of the hybrid system according to the present invention performs the VSA of the motor of the hybrid system by applying the voltage or current through the operations, returning to operation F1100, and repeatedly performing operations F1100 to F1400 while pedaling of the rider continues.

Referring to FIG. 5, FIG. 5 is a flowchart in which a case in which the power assisted driving system 100 and method utilizing the VSA of the hybrid system is intentionally turned on/off by a rider is reflected on the process flow of FIG. 4.

A process of the power assisted driving method utilizing the VSA of the hybrid system will be described below.

In operation S1000, the power assisted driving method utilizing the VSA of the hybrid system according to one exemplary embodiment of the preset invention starts, and when a rider rides the hybrid system according to the present invention, the measurement part 40 is automatically initialized, and the hybrid system waits for driving of the power transmission part 60 performed by the rider, that is, the hybrid system waits to see whether power is transmitted.

Hereinafter, operation S1000 is referred to as a start operation of the VSA method.

In operation S1100, it is determined whether a rider riding the hybrid system according to one exemplary embodiment of the present invention operates the VSA method.

In a case in which the VSA method is not operated, the operation returns to operation S1000.

In a case in which the VSA method is operated, measured values including an angle and a torque of the crank output from the measurement part 40 are transmitted to the control part 10.

In addition, a physical switch, a touch panel display, or the control part 10 operating in conjunction with a smartphone of the rider may be provided in the hybrid system as a unit for performing the VSA method according to the present invention. Since all the units are clearly known to the general public, detailed descriptions thereof will be omitted.

Hereinafter, operation S1100 is referred to as an operating determination operation of the VSA method.

In operation S1200, the measured values including the angle and torque of the crank are transmitted to the control part 10 from the measurement part 40, the control part 10 determines a voltage or current by using the received measured values in a proceeding operation, and the control part 10 also transmits the measured values to the storage part 30.

Here, although examples of the measured values are the angle and torque of the crank, the measured values are not limited thereto, and various measured values from which an operation state of the crank provided in the hybrid system is identified may be used as the measured values.

In addition, a sensor included in the measurement part 40 is a crank torque sensor or pedal force sensor, measures or predict a crank torque, measures or predicts a crank torque from an encoder or inclination sensor, outputs the measured values together, and transmits the measured values to the control part 10. The control part 10 measures a present operation state of the crank and compares the present operation state to a previous driving state to predict a following operation state of the crank.

The "measurement part 40" refers to all of the crank torque sensor or pedal force sensor, the pressure sensor, the encoder, the inclination sensor, and the like, and it should be noted that the "measurement part 40" does not specifically refer to one of a plurality of sensors which may be provided in the hybrid system.

Hereinafter, operation S1200 is referred to as a measurement operation of the VSA method.

In operation S1250, the storage part 30 stores the received measured values. As an embodiment, the storage part 30 stores the received measured values divided into the crank angle and the crank torque separately.

Here, the storing of the measured values in the storage part 30 separately does not mean that the crank angle and the crank torque are simply stored separately as individual values, but means that the crank angle and the crank torque at the corresponding angle are linked and stored.

Since the individual crank angle and the crank torque at the corresponding angle are linked and stored, in some cases, a change trend in torque of the crank according to a change in crank angle may be identified.

As an embodiment, the crank angle and the crank torque measured by the measurement part 40 may be sequentially stored in a storage table provided in the storage part 30, a crank angle and a crank torque which are newly measured during the VSA may be continuously updated in the storage table. This is to reflect the newly updated measured values to determine the voltage or current applied to a motor because a rotating speed of the crank is different whenever the crank rotates. A form of the storage table is not limited, and the measured values may be stored in various methods such as a continuous graph form, a digitized table form, and the like.

Hereinafter, operation S1250 is referred to as a storage operation of the VSA method. In operation S1300, the control part 10 determines the voltage or current applied to the motor through the following calculation, which is expressed as the following Equation 2. The voltage or current applied to the motor are determined through a method, which is the same as the method in the power assisted driving system utilizing the VSA of the hybrid system, by the following Equation 2.

$$S_{motor} = k * f(\theta_{crank}^{current} - \Phi) \quad \text{[Equation 2]}$$

Equation 2 is an equation for the control part 10 to calculate the voltage or current value applied to the motor. $S_{motor}$ is a voltage or current signal applied to the motor.

k is a proportional constant, is set to minimize a variation in wheel torque, and is set to 1 in the VSA system according to the exemplary embodiment of the present invention. In addition, k may also be adjusted to a value other than one in consideration of a travel situation and the like to minimize the variation in wheel torque. In some embodiments, various situations and k values according to the various situations are listed in a lookup table, and are stored in the storage part 30, and the control part 10 may refer to the lookup table and select a necessary value to use for calculation.

$\theta_{crank}^{current}$ refers to a present angle of the crank measured by the measurement part 40.

$\Phi$ is a phase lag angle, is a difference between a crank angle at a time at which driving power generated by the rider is supplied and a crank angle at a time at which driving power generated by VSA is supplied, and is a preset value, but may be changed to minimize energy consumption during travel. As an embodiment, in four-stroke crank driving, a phase lag angle may be 45°.

In addition, in a case in which a $\Phi$ value is 360°, since a time at which driving power is supplied by the VSA is the same as a time at which driving power is supplied by a rider, use for a VSA method becomes meaningless, but since there are some specific cases in which there is no need to generate driving power through the VSA, setting of the $\Phi$ value to 360° may be allowed.

A current or voltage value calculated by using Equation 2 is calculated as follows.

1) A previous crank angle is calculated by subtracting a preset angle from a present angle of the crank which is included in measured values of the sensor.

2) A crank torque linked to the crank angle of 1) is referred to.

3) A voltage or current applied to the motor is determined by multiplying the crank torque of 2) by a suitable gain or a proportional constant k.

Here, the gain or the proportional constant k is determined to minimize a rate of change in wheel torque of the electric bicycle.

In addition, a method may be used in which several suitable values of the proportional constant k are listed in a lookup table and stored in the storage part 30 in advance according to embodiments and the control part 10 refers to the lookup table to select a suitable value and apply the value for calculation.

In addition, the k value may be determined in consideration of a travel situation of the hybrid system.

As an embodiment, the k value may be determined by considering whether there is inclination of a road during travel. In a case in which the hybrid system travels uphill, the k value may be weighted, and in a case in which the hybrid system travels downhill, the k value may be decreased for safe travel in a situation in which the hybrid system accelerates. As described above, the k value may be listed in the lookup table, in which a relation between an inclination angle of a road and a traveling speed is used, and may be stored in the storage part 30.

The control part 10 determines the electric power and voltage necessary for power supplementing by using the measured values of the measurement part 40, which has measured an operation state of the crank, and here, more comfortable travel may be performed by considering variables according to a travel situation.

Hereinafter, operation S1300 is referred to as a determination operation of the VSA method.

In operation S1400, the voltage or current determined in operation S1300 is applied to the motor and the motor performs the VSA.

Hereinafter, operation S1400 is referred to as an application operation of the VSA method.

As described above, the power assisted driving method utilizing the VSA of the hybrid system according to the embodiment of the present invention may smoothly accelerate and improve ride comfort by repeatedly performing operations S1000 to S1400 to supplement driving power of the hybrid system so as to reduce a variation in torque.

FIG. 6 is a graph showing a magnitude of a total force according to a crank angle in a case in which the embodiment of the present invention is applied, and FIG. 7 is a graph showing a change in total torque according to a crank angle in the case in which the embodiment of the present invention is applied.

Referring to FIGS. 6 and 7, in a case in which the power assisted driving system 100 utilizing the VSA of the hybrid system and method according to the embodiment of the present invention is used, a variation in torque according to a crank angle may be identified.

FIGS. 6 and 7 are graphs showing variations in total power and the variation in torque according to the angle of the crank of the general bicycle (human only), the electric bicycle (PAS), and the electric bicycle in which the VSA system or method is applied.

The experiment shows total power and a torque necessary for realizing the same speed. In the graphs, although a crank torque of the electric bicycle is decreased when compared to that of the general bicycle, total power of the electric bicycle is increased when compared to that of the general bicycle.

However, in the case of the electric bicycle to which the VSA is applied, it may be identified that both the total power and the torque of the crank are effectively decreased, and accordingly, it may be identified that power supplementing is more effectively performed in a case in which the VSA is applied.

A power assisted driving system and method based on a crank stiffness according to another embodiment of the present invention will be described with reference to FIGS. 1 and 8 to 11.

Referring to FIG. 1, a power assisted driving system 100 based on the crank stiffness according to the embodiment of the present invention includes a control part 10, a motor part 20, a storage part 30, a measurement part 40, and a power supply part 50.

The control part 10 controls total driving of the power assisted driving system 100 based on the crank stiffness. Specifically, the control part 10 serves to control the motor part 20, the storage part 30, and the measurement part 40 which are components of the present invention. The control part 10 controls the measurement part 40 to initialize the measurement part 40, or receives measured values measured by the measurement part 40, measures an occurrence time of the power assisted driving system on the basis of the received measured values, calculates a voltage or current necessary for power supplementing in a case in which power supplementing occurs, determines the calculated voltage or current on the basis of the crank stiffness, and applies the determined voltage or current to the motor.

In addition, the control part 10 may be formed as a general microprocessor type control part.

In a case in which the power assisted driving system 100 based on the crank stiffness is realized in an electric bicycle, the control part 10 may determine a voltage or current necessary for power supplementing based on the crank stiffness according to a body size of a rider and a travel situation to reduce a rapid change in torque applied to the crank. The travel situation may be determined by considering inclination of a road and current acceleration. To consider the travel situation, a control variable according to the travel situation may be stored in the storage part 30, and the control part 10 may determine a voltage or current necessary for power assisted driving by using the control variable stored in the storage part 30.

The motor part 20 may supply driving power for driving the power assisted driving system based on the crank stiffness using the voltage or current applied at a time of power supplementing occurrence according to a control of the control part 10. In addition, although the motor part 20 may include an encoder, whether the motor part 20 includes the encoder is not related to a configuration of the present invention, and since use of the encoder in the motor part 20 are known, the encoder will not be described separately.

The storage part 30 serves to store a torque of the crank according to an angle of the crank measured by the measurement part 40, and the control part 10 may refer to the stored angle and torque of the crank.

A suitable range or optimum value of a crank torque according to an angle of the crank may be stored in the storage part 30 in a lookup table form, and the control part 10 may refer to the suitable range or optimum value as necessary.

As an embodiment, in a case in which the crank rotates, the storage part 30 may store a crank torque according to an angle of the crank measured by the measurement part 40 in a storage table. Here, since the crank rotates repeatedly, the crank torque may be continuously updated according to the crank angle, and the control part 10 may use continuously updated information.

In addition, in the exemplary embodiment of the present invention, the storage part 30 may be integrally formed with the control part 10.

The measurement part 40 measures an operation state of the crank included in the hybrid system.

The measurement part 40 may measure various variables by which a rotating state of the crank may be determined, and various measurement units may be used to measure the variables. As an embodiment, the measurement part 40 may measure an angle and a torque of the crank. The measurement part 40 may be formed to measure the angle and torque of the crank separately or together. At least one among an encoder, a crank torque sensor, a pedal force sensor, and a pressure sensor may be used as the measurement part 40 for measuring the crank angle and torque.

In the case in which the crank torque sensor is used, the crank torque sensor may be installed on a frame or crank of the hybrid system. As an embodiment, in a case in which the crank torque sensor is installed on the frame, the crank torque sensor may be installed at one location among locations by which the crank passes while rotating. This is to install the crank torque sensor within a rotating radius of the crank so as to improve accuracy of a measured value of torque.

The power supply part 50 may supply electric power to the components except itself. The power supply part 50 serves to supply electric power to the control part 10, the motor part 20, and the measurement part 40, and in a case in which the storage part 30 is not integrated with the control part 10 but is formed separately, the power supply part 50 is formed to also supply electric power to the storage part 30.

In addition, although the control part 10 does not transmit a control signal to the power supply part 50 in FIG. 1, the control part 10 may also be formed to transmit the control signal to the power supply part 50 to control electric power supplied to the parts.

Lines which connect the parts in FIG. 1 will be described. Lines which include one ends at which arrows are not drawn denote power lines for supplying electric power generated by the power supply part 50 to the parts, lines which include ends at which arrows are drawn denote a transmission direction of control signals or data, wherein the signals or data are transmitted from the components connected to the lines having the ends which do not have the arrows at the ends to the components connected to the lines having the ends which have the arrows.

In addition, in the description of the present invention, an example case in which a power assisted system based on the crank stiffness is applied to a bicycle is described for the sake of convenience in the description, but this is not to limit the power assisted system based on the crank stiffness of the present invention which is to be applied to the bicycle, and it should be understood that the bicycle is regarded as only an example such that anyone, including those skilled in the art easily understand the present invention.

A case in which the power assisted system based on the crank stiffness of the present invention is applied to a wheelchair may be understood by replacing the crank with a rotating shaft and replacing the pedal with a rim in the description of the embodiment in which it is applied to the bicycle.

In addition, a case in which the power assisted system based on the crank stiffness of the present invention is applied to an apparatus other than the bicycle and wheelchair may also be understood by replacing names of parts described as the crank and pedal in the description of the embodiment of the present invention with names of components corresponding to the crank and pedal in the corresponding apparatus.

A detailed operation of the power assisted driving system based on the crank stiffness according to another embodiment of the present invention will be described below with reference to FIG. 1.

In the power assisted driving system based on the crank stiffness, the measurement part 40 measures an operation state of the crank, and the control part 10 determines a voltage or current necessary for power assisted driving on the basis of measured values of the measurement part 40 to drive the motor part 20.

A value of the voltage or current determined by the control part 10 is determined on the basis of the crank stiffness. As an embodiment, the voltage or current value may be determined in proportion to a variation in crank torque and in inverse proportion to a variation in crank angle or rotation speed of the crank.

$$S_{motor} = k|K_{crank}(\theta_{crank}^{current})| = k\left|\frac{\Delta\tau_{crank}}{\Delta\theta_{crank}}(\theta_{crank}^{current})\right| \quad \text{[Equation 3]}$$

Here, $K_{crank}(\theta_{crank}^{current})$ is a crank stiffness at a current crank angle $\theta_{crank}^{current}$.

(In Equation 3, $S_{motor}$ is a voltage or current applied to the motor, k is a proportional constant and is a value set for reducing a rapid change in torque (changeable during travel), $K_{crank}$ is a stiffness of a crank, $$K_{crank} = \frac{\Delta\tau_{crank}}{\Delta\theta_{crank}},$$

$\Delta\tau_{crank}$ is a variation in crank torque per unit time, and $\Delta\theta_{crank}$ is a variation in crank angle per unit time.)

According to Equation 3, the control part 10 determines a voltage or current value on the basis of stiffness applied to the crank. As expressed by Equation 3, the control part 10 determines supply power on the basis of an absolute value of the stiffness so as to supply the voltage or current only in a case in which the crank moves forward.

As another embodiment, a control part 10 may determine a voltage or current value necessary for power supplementing by using Equation 4.

$$S_{motor} = k|K_{crank}(\theta_{crank}^{current} - \phi)| = k\left|\frac{\Delta\tau_{crank}}{\Delta\theta_{crank}}(\theta_{crank}^{current} - \phi)\right| \quad \text{[Equation 4]}$$

Here, $K_{crank}(\theta_{crank}^{current})$ is a crank stiffness at a present crank angle $\theta_{crank}^{current}$.

(In Equation 4, $S_{motor}$ is a voltage or current applied to the motor, k is a proportional constant and is a value set for reducing a rapid change in torque (changeable during travel), $K_{crank}$ is a stiffness of a crank, $$K_{crank} = \frac{\Delta\tau_{crank}}{\Delta\theta_{crank}},$$

Φ is a phase lag angle and is a variable to reduce energy consumed for driving (changeable during travel), $\Delta\tau_{crank}$ is a variation in crank torque per unit time, $\Delta\theta_{crank}$ is a variation in crank angle per unit time.)

In Equation 4, a voltage or current applied to the motor is determined by considering a phase lag angle and a stiffness value determined by the control part 10. The control part 10 may identify driving intention of a rider from the crank stiffness, supplement power at a suitable time by using the phase lag angle to reduce a strange sensation, and remove unnecessary power for driving in order to improve energy efficiency.

The k value used in Equations 3 and 4 may be changed according to a variation in torque of the crank. As an embodiment, in a case in which a variation in torque is a positive variation, it is determined that driving intention of the rider is high, and the k value may be increased, and in a case in which the variation in torque is a negative variation, it is determined that driving intention of the rider is low, and the k value may be decreased.

In addition, the k value is a proportional constant, is a value set to reduce a rapid change in torque, and may be changed according to a changing situation during travel.

FIG. 8 is a graph showing an amount of total power consumption according to a crank angle in a conventional power assisted system, and FIG. 9 is a graph showing an amount of total power consumption according to a crank angle in a case in which another embodiment of the present invention is applied. FIGS. 8 and 9 are graphs drawn from an experiment conducted under conditions of the same load and traveling speed, and the power assisted driving system based on a crank stiffness may be representatively applied to the electric bicycle.

FIG. 8 is the graph of the case in which the conventional power assisted system supplements power by using a general PAS mode, and the graph shows that driving of a pedal and power supplementing of a motor occur in the same cycle.

FIG. 9 is the graph of the case in which the power assisted driving system based on a crank stiffness according to another embodiment of the present invention is applied, and the graph shows that there is a difference in phase at which driving of a motor and driving of a pedal have peak values and a phase is shifted at a certain angle.

In addition, in FIG. 9, it may be identified that the power assisted driving system does not operate continuously, but supplements power during a time in which a rider generates power through pedaling, and power supplementing power reduces at a certain time (before reaching a maximum value).

In comparison with FIG. 8 and FIG. 9, although an average of total power is 136. 8 W in the case of the PAS, an average of total power is 114 W in another embodiment of the present invention, and this means that total necessary power reduces. It may be identified that unnecessary energy consumption, which is due to a strange sensation between a rider and a pedal for transmitting power, is reduced, and energy efficiency is improved.

Meanwhile, hereinafter, a power assisted driving method based on a crank stiffness according to another embodiment of the present invention will be described with reference to the accompanying drawings. However, descriptions of portions which are the same as the portions described in the power assisted driving system based on the crank stiffness according to another embodiment of the present invention will be omitted.

FIG. 10 is a flowchart illustrating a process flow of a power assisted driving method based on a crank stiffness according to another embodiment of the present invention, and FIG. 11 is a flowchart illustrating a process order of the power assisted driving method based on the crank stiffness. Components which are illustrated in FIGS. 10 and 11 and have the same reference numerals will be assigned to the same reference numerals of the corresponding components of FIGS. 1 and 8 to 9, and detailed descriptions thereof will be omitted.

Referring to FIG. 10, a schematic process flow of a power assisted driving method based on the crank stiffness according to another embodiment of the present invention is divided into six operations from F2000 to F2500.

Hereinafter, each of the six operations from F2000 to F2500 will be described. As described above, the present invention will be described on the basis of the electric bicycle which is a representative example.

In operation F2000, a pedal assisted driving method based on the crank stiffness according to the present invention starts, and when a rider rides the electric bicycle according to the present invention, a pedal input of the rider, that is, a pedaling operation, is waited for.

In operation F2100, when the crank starts to rotate by the pedaling of the person riding the electric bicycle according to the present invention, sensor(s) starts to measure and outputs measured values.

In operation F2200, a torque and an angle of the crank are obtained from the output of the crank torque sensor.

In operation F2300, a variation in crank torque per unit time, which may be obtained from the crank torque value and the crank angle value obtained in operation F2200, is divided by a variation in crank angle per unit time and an absolute value thereof is taken to obtain a crank stiffness.

In operation F2400, a voltage or current applied to the motor is determined by reflecting a phase lag angle φ on the crank stiffness obtained in operation F2300 and multiplying the crank stiffness by a proportional constant k at a crank angle position delayed by the phase lag angle φ. That is, a signal of the motor applied at a present crank angle is actually a value obtained by multiplying the crank stiffness obtained at a crank angle before the phase lag angle φ by a gain k.

In operation F2500, the voltage or current applied to the motor and determined in operation F2400 is applied to the motor.

The pedal assisted driving method based on a crank stiffness of an electric bicycle according to the present invention reflects a change in a crank stiffness and drives the motor of the electric bicycle by applying the voltage or current to the motor through the above operations, returning to operation F2100, and repeatedly performing the above-described operations F2100 to F2500 while pedaling of the rider continues.

FIG. 11 is the flowchart illustrating a process order of the power assisted driving method based on a crank stiffness.

FIG. 11 is the flowchart in which a case, in which the pedal assisted driving method based on the crank stiffness is intentionally turned on/off by a rider, is reflected on the process flow of FIG. 10.

A process of the pedal assisted driving method based on a crank stiffness of an electric bicycle according to the exemplary embodiment of the present invention will be described below with reference to FIG. 11.

Hereinafter, each of six operations from S2000 to S2500 will be described in detail.

In operation S2000, the pedal assisted driving method based on the crank stiffness according to the present invention starts, and when a rider rides the electric bicycle according to the present invention, an output of the sensor(s) is automatically initialized, a pedal input of the rider, that is, a pedaling operation, is waited for.

In operation S2100, the rider riding the electric bicycle according to the present invention determines whether the pedal assisted driving method based on the crank stiffness is operated, and in a case in which the pedal assisted driving method based on the crank stiffness is not operated, the operation is returned to operation S2000. In a case in which the pedal assisted driving method based on the crank stiffness is operated, the sensor(s) starts to measure so as to output measured values when the crank starts to rotate due to the pedaling.

In operation S2200, a torque and an angle of the crank are obtained from an output of the sensor installed on a frame or the crank of the electric bicycle according to the present invention.

As an embodiment, at least one of a crank torque sensor, a pedal force sensor, and a pressure sensor is used as the sensor, and the crank torque measured by the sensor and the crank angle is measured by an encoder or inclination sensor at the same time, and the two measured values may be output.

In operation S2300, a variation in crank torque per unit time obtained from the crank torque value and the crank angle value obtained in operation S2200 is divided by a variation in crank angle per unit time, and an absolute value is taken to obtain a crank stiffness.

In operation S2400, a voltage or current applied to the motor is determined by reflecting a phase lag angle φ on the crank stiffness obtained in operation F2300 and multiplying the crank stiffness by a proportional constant k at a crank angle position delayed by the phase lag angle φ. A calculation process thereof will be expressed by the following Equation 5.

In addition, in order to remove phase delay in operation S2400, the following Equation 6 may also be used.

In operation S2500, the voltage or current applied to the motor and determined in operation S2400 is applied to the motor.

$$S_{motor} = k|K_{crank}(\theta_{crank}^{current})| = k\left|\frac{\Delta\tau_{crank}}{\Delta\theta_{crank}}(\theta_{crank}^{current})\right| \quad \text{[Equation 5]}$$

Here, $K_{crank}(\theta_{crank}^{current})$ is a crank stiffness at a present crank angle $\theta_{crank}^{current}$.

In Equation 5, $S_{motor}$ is a voltage or current applied to the motor, k is a proportional constant and is a value set to reduce a rapid change in torque (changeable during travel), $K_{crank}$ is a stiffness of the crank, $$K_{crank} = \frac{\Delta\tau_{crank}}{\Delta\theta_{crank}},$$

$\Delta\tau_{crank}$ is a variation in crank torque per unit time, and $\Delta\theta_{crank}$ is a variation in crank angle per unit time.

According to Equation 5, the control part 10 determines a voltage or current value on the basis of a stiffness applied to the crank. As expressed by Equation 5, electric power supply is determined on the basis of an absolute value of the stiffness so as to supply the voltage or current only in a case in which the crank moves forward.

As another embodiment, the control part 10 may determine a voltage or current value for power supplementing by using the following Equation 6.

$$S_{motor} = k|K_{crank}(\theta_{crank}^{current} - \phi)| = k\left|\frac{\Delta\tau_{crank}}{\Delta\theta_{crank}}(\theta_{crank}^{current} - \phi)\right| \quad \text{[Equation 6]}$$

Here, $K_{crank}(\theta_{crank}^{current})$ is a crank stiffness at a present crank angle $\theta_{crank}^{current}$.

(In Equation 6, $S_{motor}$ is a voltage or current applied to the motor, k is a proportional constant and is a value set to reduce a rapid change in torque (changeable during travel), $K_{crank}$ is a stiffness of the crank, $$K_{crank} = \frac{\Delta\tau_{crank}}{\Delta\theta_{crank}},$$

$\Phi$ is a phase lag angle, and is a variable to reduce energy consumed for driving (changeable during travel), $\Delta\tau_{crank}$ is a variation in crank torque per unit time, $\Delta\theta_{crank}$ is a variation in crank angle per unit time.)

As described above, the embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

| [Reference Numerals] | |
|---|---|
| 10: CONTROL PART | 20: MOTOR PART |
| 30: STORAGE PART | 40: MEASUREMENT PART |
| 50: POWER SUPPLY PART | |
| 60: POWER TRANSMISSION PART | |

The invention claimed is:

1. A power assisted driving system comprising:
a measurer configured to measure an operation state of a crank;
a controller configured to determine a voltage or current necessary for power supplementing on the basis of a measured value of the measurer;
a motor to which the voltage or current is applied to supply driving power; and
a power supply configured to supply electric power to components except itself,
wherein the controller determines a value of the voltage or current value on the basis of a stiffness of the crank.

2. The power assisted driving system of claim 1, wherein the measurer measures both an angle and a torque of the crank provided in a hybrid system.

3. The power assisted driving system of claim 2, wherein the measurer includes at least one among a crank torque sensor, a pedal force sensor, and a pressure sensor.

4. The power assisted driving system of claim 3, wherein the crank torque sensor is installed on a frame or the crank of the hybrid system.

5. The power assisted driving system of claim 4, wherein, in a case in which the crank torque sensor is installed on the frame, the crank torque sensor is installed at one location among locations by which the crank passes while rotating.

6. The power assisted driving system of claim 2, further comprising a storage part configured to store the torque of the crank according to the angle of the crank.

7. The power assisted driving system of claim 2, wherein the controller selects a control variable according to a travel situation to reduce a rapid change in torque applied to the crank and determines the voltage or current necessary for virtual stroke actuation by considering the control variable.

8. The power assisted driving system of claim 2, wherein the controller determines the voltage or current applied to a motor by using the following Equation 1:

$$S_{motor} = k*f(\theta_{crank}^{current} - \Phi), \quad \text{[Equation 1]}$$

(In Equation 1, $S_{motor}$ is a voltage or current applied to the motor, $f(\theta_{crank})$ is a crank torque corresponding to a crank angle $\theta_{crank}$, k is a proportional constant and a value set to reduce a rapid change of a torque (changeable during travel), $\theta_{crank}^{current}$ is a present angle of the crank, and $\Phi$ is a phase lag angle and a value for increasing energy efficiency (changeable during travel)).

9. The power assisted driving system of claim 2, wherein:
a power transmission part is rotatable and connected to the crank; and
the measurer measures a torque applied to the crank from a force applied to the power transmission part.

10. The power assisted driving system of claim 9, wherein the measurer calculates a torque of a shaft of the crank by switching a vertical force component and a horizontal force component applied to the power transmission part to a tangential force component and a normal force component applied to the crank.

11. The power assisted driving system of claim 1, wherein the measurer includes at least one among a crank torque sensor, a pedal force sensor, and a pressure sensor.

12. The power assisted driving system of claim 11, wherein the crank torque sensor is installed on a frame or the crank.

13. The power assisted driving system of claim 12, wherein, in a case in which the crank torque sensor is installed on the frame, the crank torque sensor is installed at one location among locations by which the crank passes while rotating.

14. The power assisted driving system of claim 1, wherein the value of the voltage or current determined by the controller is in proportion to a variation in crank torque and in inverse proportion to a variation in crank angle or a rotating speed of the crank.

15. The power assisted driving system of claim 1, further comprising a storage part configured to store the torque of the crank according to the angle of the crank.

16. The power assisted driving system of claim 14, wherein stiffness of the crank is determined by the following Equation 3:

$$S_{motor} = k|K_{crank}(\theta_{crank}^{current})| = k\left|\frac{\Delta\tau_{crank}}{\Delta\theta_{crank}}(\theta_{crank}^{current})\right|, \quad \text{[Equation 3]}$$

here, $K_{crank}(\theta_{crank}^{current})$ is a crank stiffness at a present crank angle $\theta_{crank}^{current}$, (In Equation 3, $S_{motor}$ is a voltage or current applied to a motor, k is a proportional constant and a value set for reducing a rapid change in torque (changeable during travel), $K_{crank}$ is a stiffness of a crank, $$K_{crank} = \frac{\Delta\tau_{crank}}{\Delta\theta_{crank}},$$

$\Delta\tau_{crank}$ is a variation in crank torque per unit time, and $\Delta\theta_{crank}$ is a variation in crank angle per unit time).

17. The power assisted driving system of claim 14, wherein a stiffness of the crank is determined by the following Equation 4:

$$S_{motor} = k|K_{crank}(\theta_{crank}^{current} - \phi)| = k\left|\frac{\Delta\tau_{crank}}{\Delta\theta_{crank}}(\theta_{crank}^{current} - \phi)\right|, \quad \text{[Equation 4]}$$

here, $K_{crank}(\theta_{crank}^{current})$ is a crank stiffness at a present crank angle $\theta_{crank}^{current}$, (In Equation 4, $S_{motor}$ is a voltage or current applied to a motor, k is a proportional constant and a value set for reducing a rapid change in torque (changeable during travel), $K_{crank}$ is a stiffness of a crank, $$K_{crank} = \frac{\Delta\tau_{crank}}{\Delta\theta_{crank}},$$

$\Phi$ is a phase lag angle and a variable to reduce energy consumed for driving (changeable traveling), $\Delta\tau_{crank}$ is a variation in crank torque per unit time, and $\Delta\theta_{crank}$ is a variation in crank angle per unit time).

\* \* \* \* \*